United States Patent
Gupta et al.

(10) Patent No.: US 10,852,219 B2
(45) Date of Patent: Dec. 1, 2020

(54) DEPARAFFINIZING COMPOSITIONS AND METHODS

(71) Applicants: Bipin Gupta, Pleasanton, CA (US); Marc Key, Ojai, CA (US)

(72) Inventors: Bipin Gupta, Pleasanton, CA (US); Marc Key, Ojai, CA (US)

(73) Assignees: Diagnostic BioSystems, Pleasanton, CA (US); Marc Key, Ojai, CA (US)

( * ) Notice: Subject to any disclaimer, the term of this patent is extended or adjusted under 35 U.S.C. 154(b) by 168 days.

(21) Appl. No.: 16/111,755

(22) Filed: Aug. 24, 2018

(65) Prior Publication Data

US 2019/0128784 A1 May 2, 2019

Related U.S. Application Data

(60) Provisional application No. 62/580,836, filed on Nov. 2, 2017.

(51) Int. Cl.
*G01N 1/30* (2006.01)
*G01N 1/36* (2006.01)

(52) U.S. Cl.
CPC ............... *G01N 1/30* (2013.01); *G01N 1/36* (2013.01)

(58) Field of Classification Search
CPC ...................................................... G01N 1/30
See application file for complete search history.

(56) References Cited

U.S. PATENT DOCUMENTS

| 6,451,551 | B1 | 9/2002 | Zhan et al. |
| 6,632,598 | B1 | 10/2003 | Zhang et al. |
| 6,649,368 | B1 | 11/2003 | Aghassi et al. |
| 6,855,552 | B2 | 2/2005 | Towne et al. |
| 6,855,559 | B1 | 2/2005 | Christensen et al. |
| 7,067,325 | B2 | 6/2006 | Christensen et al. |
| 7,410,753 | B2 | 8/2008 | Hopkins et al. |
| 8,288,121 | B2 | 10/2012 | Kram et al. |
| 8,512,978 | B2 | 8/2013 | Kram et al. |

FOREIGN PATENT DOCUMENTS

WO WO-2007129348 A1 * 11/2007 ............. C09K 8/524

* cited by examiner

*Primary Examiner* — Bin Shen
(74) *Attorney, Agent, or Firm* — PatentFile, LLC; Bradley C. Fach; Steven R. Kick

(57) ABSTRACT

A deparaffinizing composition and method are provided for removing paraffin wax from biological samples. The deparaffinizing composition may include: a paraffin solvent that may be a first apolar paraffin solvent; a second apolar solvent that may be at least partially miscible with water; a first polar solvent that may be miscible with both water and apolar solvents; a second polar solvent that may be water; and a detergent. The deparaffinizing method may include the steps of: incubating the sample for a time period in a deparaffinizing composition; and rinsing the sample with an aqueous buffer. Preferably, the step of incubating the sample for a time period in the deparaffinizing composition may include heating the sample and the composition to between approximately 35 to 65 degrees Celsius.

17 Claims, 2 Drawing Sheets

DEPARAFFINIZING COMPOSITIONS AND METHODS

CROSS REFERENCE TO RELATED APPLICATIONS

This application claims priority to and the benefit of the filing date of U.S. Provisional Application No. 62/580,836, filed on Nov. 2, 2017, entitled "Stable Mixtures Of Paraffin Solvents", which is hereby incorporated by reference in its entirety.

FIELD OF THE INVENTION

This patent specification relates to the field of compositions and methods for removing paraffin from paraffin-embedded biological samples. More specifically, this patent specification relates to a stable aqueous paraffin solvent composition and method for removing paraffin from paraffin-embedded biological samples.

BACKGROUND

The analysis of biological tissue samples is a valuable diagnostic tool used by the pathologist to diagnose many illnesses including cancer and infectious diseases and by the medical researcher to obtain information about cellular structure. The process of preparing a biological sample for microscopic analysis frequently includes first embedding the sample in a supporting paraffin matrix. The paraffin provides a suitable matrix so that the sample may be cut into thin sections for subsequent staining and microscopic analysis. Several steps must precede the staining process. The first step includes removal of the paraffin as the presence of paraffin inhibits the staining process. The present invention provides a means of removing the paraffin by heating the biological sample to increase solubility of the paraffin but below the melting point of paraffin. The solubilized paraffin can then be removed by discarding the paraffin solvent solution leaving behind the deparaffinized sample. The process of deparaffinization is frequently carried out on a thin section of the biological sample that has been attached to a microscope slide.

The paraffin solvent must be removed and replaced with water (or an aqueous solution) in a process called rehydration. Rehydration restores a sample to a more normal state conducive to molecular analysis. Typically, rehydration is a two-step process. The first step involves removing the paraffin solvent and replacing it with a water-miscible solvent. The ideal solvent for step one is any solvent that is both miscible with the paraffin solvent and with water. Such a solvent would be any alcohol, such as ethanol, methanol, or propanol. Other solvents could include acetone or methylene chloride. The most commonly used alcohol in histological laboratories is ethanol.

Following completion of this step the paraffin solvent is replaced by an alcohol, such as ethanol, permeates the sample. In the second step the alcohol is removed and replaced with water. The samples are first removed from the alcohol bath and submerged in water. Typically, the samples are incubated through a series of graded solutions starting with a mixture of the alcohol and paraffin solvent, gradually increasing the alcohol concentration until the samples are in pure alcohol. Next the samples are incubated in a series of alcohol and water mixtures, gradually increasing the water concentration until the samples are in pure water. The water (or other aqueous solution) now permeates the sample, thus completing the rehydration process.

While methods and compositions exist for removing paraffin wax from a sample, they all suffer from one or more drawbacks that limit their effectiveness. Other methods and compositions that exist for removing paraffin wax from a sample typically involve procedures that are complex and time consuming that often utilize expensive and/or toxic materials. Methods of deparaffinization can be generally broken down into two broad categories: 1) solubilizing, or 2) melting.

In the solubilization method an apolar paraffin solvent is applied to the tissue for sufficient length of time to dissolve the paraffin into the solvent. After the solubilization step the dissolved paraffin and solvent are removed by applying a second polar solvent that is miscible with both the apolar paraffin solvent and with water or aqueous buffers. The third step involves replacing the second polar solvent with water or buffer. The tissue is now deparaffinized, rehydrated, and ready for staining. There are two drawbacks to this method. First it is complex and time-consuming, making it inconvenient for the user and difficult to automate. Secondly it requires the use of hazardous solvents.

An alternative method is to melt the paraffin by placing the paraffinized tissue into a hot aqueous liquid that has been heated to greater than the melting point of paraffin, typically around 60 C. The melted paraffin is then released into the hot liquid, while simultaneously being rehydrated. This method has the advantage of simplicity, ease of automation, and avoids hazardous solvents. However, these methods cannot remove the paraffin that is trapped between the tissue and the microscope slide, because this requires that the paraffin pass through the hydrophilic tissue layer, which it is unable to do in the presence of polar solvents or aqueous solvents. Consequently, small droplets of paraffin remain trapped beneath the tissues that are apparent when the tissue is examined microscopically. These microscopic paraffin droplets can interfere with the subsequent microscopic examination of the tissue. For example, U.S. Pat. No. 6,649,368 discloses a composition for deparaffinization containing a mixture of water, buffer salts, and detergents. This composition removes paraffin by melting, however, it cannot transport the melted paraffin through the hydrophilic tissue barrier. Therefore, small droplets of melted paraffin remain entrapped beneath the tissue section.

Hence there is a need for an improved method of deparaffinization that can remove paraffin completely from around and underneath the tissue while simultaneously rehydrating the tissue. Furthermore, the method should be simple to perform, easy to automate, and reduce the amount of hazardous solvents that are required to perform the procedure.

Therefore, a need exists for novel compositions and methods for deparaffinizing biological samples. A further need exists for novel deparaffinizing compositions and methods that are able to completely remove paraffin from and beneath tissue sections and samples. There is also a need for novel deparaffinizing compositions and methods that are not complex and time consuming. Finally, a need exists for novel deparaffinizing compositions and methods that do not utilize expensive and/or toxic materials.

BRIEF SUMMARY OF THE INVENTION

A deparaffinizing composition and method are provided for removing paraffin wax from biological samples. The composition and method greatly simplify the deparaffinizing process by providing a single reagent that can be used to replace all of the solutions of paraffin solvents, alcohols, and water. This single mixture can deparaffinize and rehydrate in a single step. The method and composition are novel and superior to existing methods and compositions for removing paraffin wax from biological samples in many ways including not being complex, time consuming, or utilizing expensive and/or toxic materials.

According to one aspect consistent with the principles of the invention, a deparaffinizing composition is provided. The composition may include: a first paraffin solvent that may be or may comprise a first apolar paraffin solvent; a second apolar solvent that may be at least partially miscible with water; a first polar solvent that may be miscible with both water and apolar solvents; a second polar solvent that may be water; and a detergent.

In some embodiments, the composition may include between 10% to 40%, by volume, paraffin solvent; between 1% to 40%, by volume, second apolar solvent; between 0.1% to 10%, by volume, detergent; between 10% to 40%, by volume, water; and between 1% to 40%, by volume, first polar solvent.

In further embodiments, the composition may include between 20% to 30%, by volume, paraffin solvent; between 1% to 5%, by volume, second apolar solvent; between 0.1% to 5%, by volume, detergent; between 20% to 30%, by volume, water; and between 20% to 30%, by volume, first polar solvent.

In still further embodiments, the composition may include approximately 25%, by volume, paraffin solvent; 2%, by volume, second apolar solvent; 3%, by volume, detergent; 25%, by volume, water; and 25%, by volume, first polar solvent.

According to another aspect consistent with the principles of the invention, a deparaffinizing method for removing paraffin wax from a biological sample is provided. The method may include the steps of: incubating the sample for a time period in a deparaffinizing composition; and rinsing the sample with an aqueous buffer. Preferably, the step of incubating the sample for a time period in the deparaffinizing composition may include heating the sample and the composition to between approximately 35 to 65 degrees Celsius.

In some embodiments, the step of incubating the sample for a time period in a deparaffinizing composition may include heating the sample and the composition to between approximately 45 to 60 degrees Celsius.

In further embodiments, the sample may be incubated in the deparaffinizing composition for a time period that may be between approximately 2 to 45 minutes.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Figure 1:
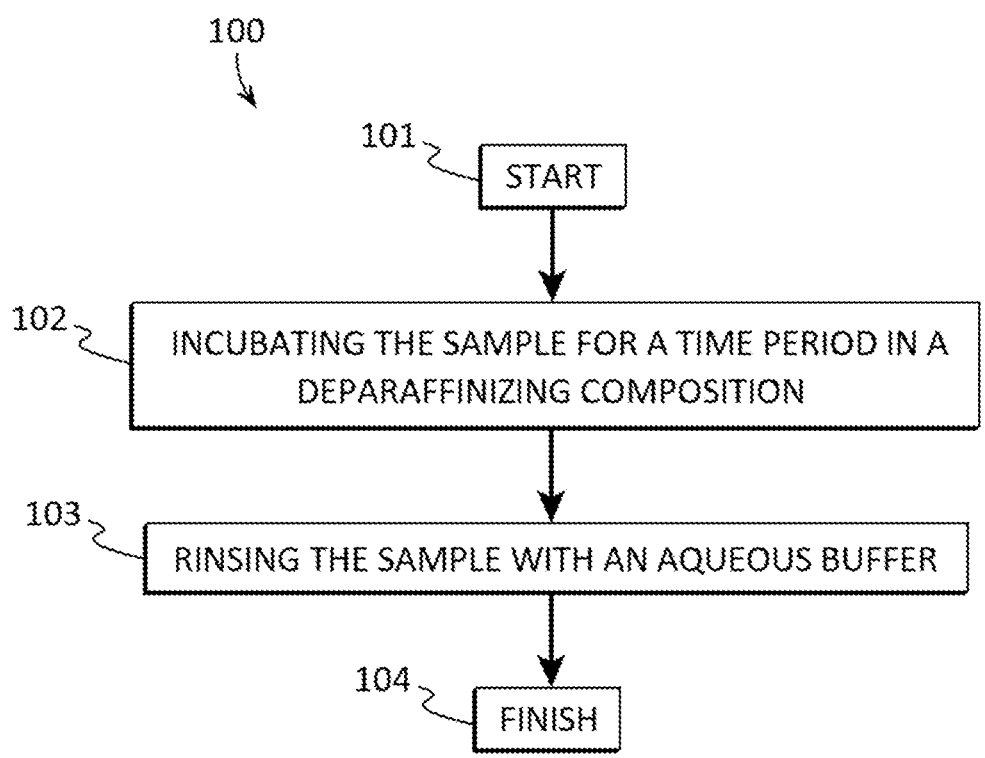
FIG. 1-FIG. 1 depicts a block diagram of an example of a deparaffinizing method for removing paraffin wax from a biological sample using a deparaffinizing composition according to various embodiments described herein.

For purposes of description herein, the terms "upper", "lower", "left", "right", "rear", "front", "side", "vertical", "horizontal", and derivatives thereof shall relate to the invention as oriented in FIG. 1. However, one will understand that the invention may assume various alternative orientations and step sequences, except where expressly specified to the contrary. Therefore, the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Although the terms "first", "second", etc. are used herein to describe various elements, these elements should not be limited by these terms. These terms are only used to distinguish one element from another element. For example, the first element may be designated as the second element, and the second element may be likewise designated as the first element without departing from the scope of the invention.

As used in this application, the term "about" or "approximately" refers to a range of values within plus or minus 10% of the specified number. Additionally, as used in this application, the term "substantially" means that the actual value is within about 10% of the actual desired value, particularly within about 5% of the actual desired value and especially within about 1% of the actual desired value of any variable, element or limit set forth herein.

New compositions and methods for removing paraffin wax from a sample are discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

The present invention will now be described by example and through referencing the appended figures representing preferred and alternative embodiments. Histological tissue sections are frequently embedded in paraffin wax as one of the preparatory steps in preparing a histological sample for subsequent staining and microscopic analysis. The paraffin provides a rigid supporting matrix so that the histological sample can be cut into thin sections. Each cut section can then be affixed to a microscope slide in preparation for subsequent staining. However, before the tissue section can be stained the paraffin must be completely removed in a process called deparaffinization. Once deparaffinization is completed the paraffin solvent must next be removed, typically using a polar solvent such as alcohol. Finally, the polar solvent must be removed and replaced with an aqueous buffer comprised mostly of water in a process called rehydration. The process of deparaffinization and rehydration is a multi-step process that typically involves moving a tissue section affixed to a microscope slide through a series of paraffin solvents, alcohols, and waters. Typically, this process may involve about six or more separate reagent containers containing the various solutions. Furthermore, many of these solutions are known toxins, are flammable, or both. What is needed is a composition of a paraffin solvent that can perform all of the steps of deparaffinization and rehydration with a single composition in a single step. Ideally this composition should be non-toxic and nonflammable.

Solvents can be classified as apolar (neutral charged) or polar (positive or negative charged). Apolar solvents can be used to dissolve apolar materials, such as waxes and oils. In general apolar solvents are miscible with other apolar solvents and also with many polar solvents. However, apolar solvents are not miscible with water. A few apolar solvents are partially miscible with water, perhaps up to 10% water, but not higher and usually not higher than about 5%. Polar solvents are generally used to dissolve polar materials such as various organic and inorganic compounds, but cannot solubilize apolar materials such as waxes and oils. Some polar solvents are miscible with other polar solvents, with many apoloar solvents, and with water.

Figure 2:
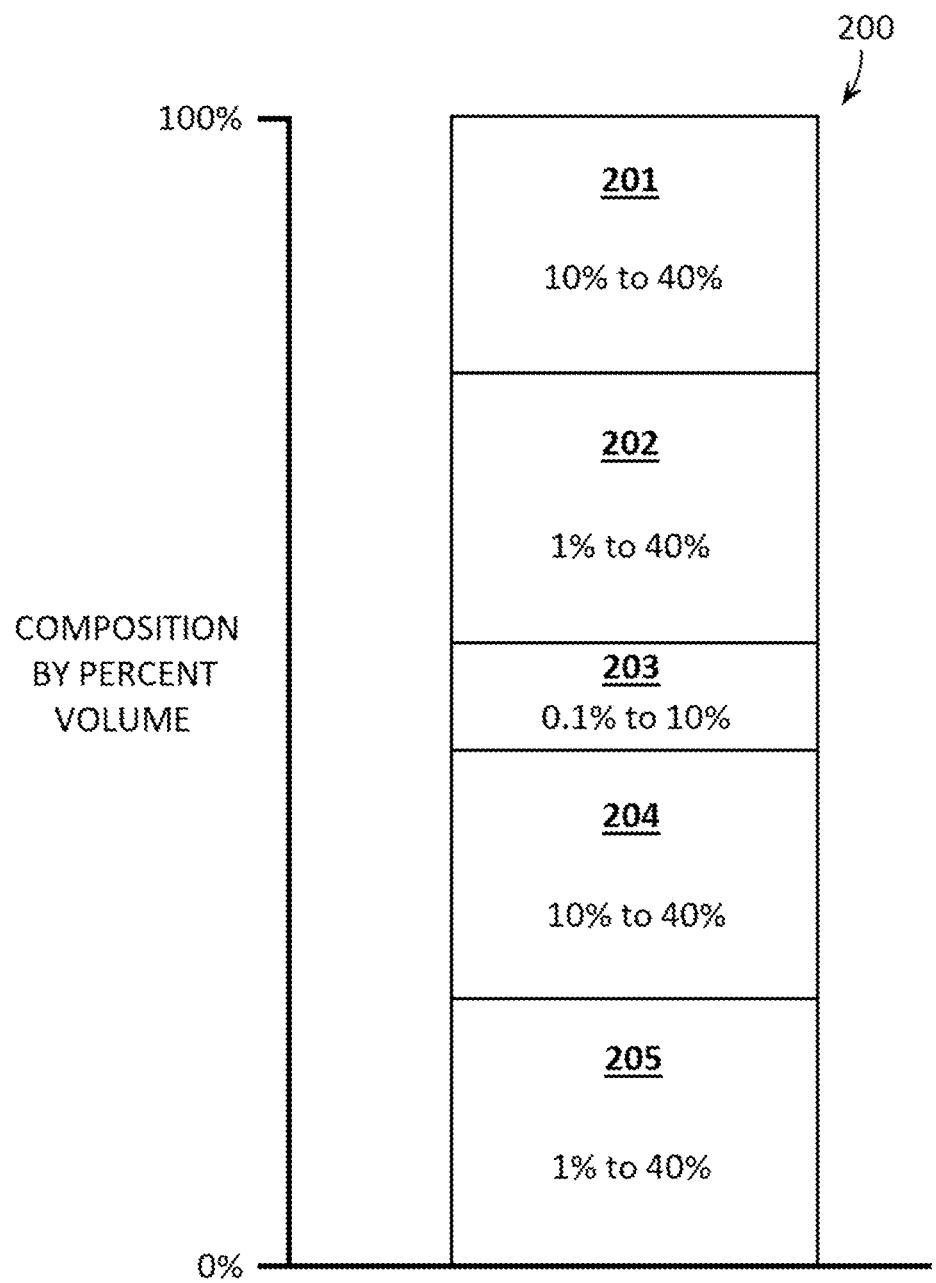
FIG. 2-FIG. 2 illustrates a block diagram of the components of a deparaffinizing composition according to various embodiments described herein.

In a first embodiment, the invention is directed to a composition of matter for removing paraffin wax ("the composition" or "the deparaffinizing composition") 200 from biological samples. In preferred embodiments and as shown in FIG. 2, the composition 200 may comprise a first paraffin solvent 201, a second apolar solvent 202 that is partially miscible with water, a first polar solvent 205 that is miscible with both water and apolar solvents, a second polar solvent 204 that is preferably water, and a detergent 203. In some embodiments, the composition 200 may comprise between 10 and 40 percent, more preferably between 20 to 30 percent, and still more preferably approximately 25 percent, by volume, first paraffin solvent 201. In further embodiments, the composition 200 may comprise between 1.0 and 40 percent, more preferably between 1.0 to 5.0 percent, and still more preferably approximately 2.0 percent, by volume, second apolar solvent 202 that is partially miscible with water. In further embodiments, the composition 200 may comprise between 10 and 40 percent, more preferably between 20 to 30 percent, and still more preferably approximately 25 percent, by volume, first polar solvent 205 that is miscible with both water and apolar solvents. In still further embodiments, the composition 200 may comprise between 10 and 40 percent, more preferably between 20 to 30 percent, and still more preferably approximately 25 percent, by volume, second polar solvent 204 that is preferably water. In still further embodiments, the composition 200 may comprise between 0.1 and 10 percent, more preferably between 0.1 to 5 percent, and still more preferably approximately 3 percent, by volume, detergent 203.

In preferred embodiments, the composition 200 may comprise a first paraffin solvent 201 that may be an apolar solvent. An apolar paraffin solvent may comprise any solvent with the ability to dissolve paraffin wax. Such solvents may include xylene, toluene, d-limonene, naphthalene, and other naphthalene derivatives. When used at 100% concentration, these solvents have the capability of dissolving paraffin. A preferred apolar paraffin solvent is d-limonene as it has been reported to be non-toxic and biodegradable. D-limonene is derived from the oil of citrus fruits. At 100% concentration d-limonene can dissolve paraffin at ambient temperature within a few minutes (2-10 minutes). At lower concentrations the time required to dissolve paraffin increases. However, by increasing the temperature the solubility of paraffin is increased. For example, at concentrations of d-limonene as low as 10%, deparaffinization can be achieved within 5 minutes by increasing the reaction temperature to approximately 45 degree to 50 degrees Celsius. It should be understood that a first apolar paraffin solvent may comprise two or more paraffin solvents. For example, a first apolar paraffin solvent of the composition 200 may comprise d-limonene and naphthalene.

Apolar solvents can be classified according to their polarity index. Polarity index is a relative measure of the degree of interaction of a solvent with various polar test solutes. The lower the polarity index the more apolar the solvent. Table 1 provides some examples of apolar solvents that can dissolve paraffin.

TABLE 1

| Solvent | Formula | Polarity Index |
| --- | --- | --- |
| cyclohexane | $C_6H_{12}$ | 0.006 |
| pentane | $C_5H_{12}$ | 0.009 |
| hexane | $C_6H_{14}$ | 0.009 |
| heptane | $C_7H_{16}$ | 0.012 |
| carbon tetrachloride | $CCl_4$ | 0.052 |
| carbon disulfide | $CS_2$ | 0.065 |
| p-xylene | $C_8H_{10}$ | 0.074 |
| toluene | $C_7H_8$ | 0.099 |
| benzene | $C_6H_6$ | 0.111 |
| ether | $C_4H_{10}O$ | 0.117 |
| water | $H_2O$ | 1 |

In preferred embodiments, the paraffin solvent 201 of the composition 200 may comprise a first apolar paraffin solvent having a polarity index less than approximately 0.120 using a standard of water having a polarity index of approximately 1.0.

In preferred embodiments, the composition 200 may comprise a second apolar solvent 202 selected from a group of solvents capable of holding up to 10% water. Although most apolar solvents cannot mix with water, a few apolar solvents are capable of holding approximately 1-10% water. Although the water carrying capacity is relatively low, it still increases the amount of water that can be mixed with the paraffin solvent and remain stable.

Most apolar paraffin solvents are almost completely immiscible with water (<1%). When such solvents are mixed with water the mixture turns cloudy and eventually the two liquids will separate into an upper and lower liquid based on their densities. A few apolar solvents have the capacity to mix with larger amounts of water forming stable solutions provided the solubility limits are not exceeded. These solvents can be mixed with the first paraffin solvent at any concentration and form stable solutions. These solutions now have the capability of holding a certain percentage of water as a stable solution, provided the solubility limits for the water are not exceeded. Thus, the mixture of these two solvents has the property of containing both a paraffin solvent and water in a stable solution.

In some embodiments, the second apolar solvent 202 may comprise an apolar solvent with water carrying capabilities, such as any apolar solvent that can carry greater than 1% water and is also miscible with the first solvent which is the paraffin solvent.

Table 2 shows some typical solvents along with of their physical properties. Attention is drawn to the column labeled "Dielectric Constant". This constant is one of the useful measures applied to polar and apolar solvents. When the dielectric constant is high, the solvent has greater polarity, and when the dielectric constant is low, the solvent has lower polarity. Thus, solvents with high dielectric constant are classified as polar solvents and those with low dielectric constant are classified as apolar solvents. By examining Table 1 it can be seen that water, a highly polar solvent, has a dielectric constant of 78.54, whereas xylene, the most commonly used paraffin solvent, has a dielectric constant of 2.27. The solvents in Table 1 are arranged in ascending order based on their dielectric constant.

TABLE 2

Common Organic Solvents Listed According to Dielectric Constant

| Solvent | Formula | Solubility in Water (g/100 g) | Dielectric Constant |
|---|---|---|---|
| pentane | $C_5H_{12}$ | 0.04 | 1.84 |
| hexane | $C_6H_{14}$ | 0.014 | 1.89 |
| heptane | $C_7H_{16}$ | 0.01 | 1.92 |
| cyclohexane | $C_6H_{12}$ | <0.1 | 2.02 |
| carbon tetrachloride | $CCl_4$ | 0.08 | 2.24 |
| p-xylene | $C_8H_{10}$ | Insoluble | 2.27 |
| benzene | $C_6H_6$ | 0.18 | 2.28 |
| m-xylene | $C_8H_{10}$ | Insoluble | 2.37 |
| triethyl amine | $C_6H_{15}N$ | 0.02 | 2.4 |
| methyl t-butyl ether | $C_5H_{12}O$ | 5.1 | 2.5 |
| o-xylene | $C_8H_{10}$ | Insoluble | 2.57 |
| diethyl ether | $C_4H_{10}O$ | 7.5 | 4.267 |
| chloroform | $CDL_3$ | 0.795 | 4.81 |
| chlorobenzene | $C_6H_5Cl$ | 0.05 | 5.69 |
| diglyme (diethylene glycol) | $C_6H_{14}O_3$ | Miscible | 7.23 |
| 1,2-dimethoxy- | $C_4H_{10}O_2$ | Miscible | 7.3 |
| tetrahydrofuran (THF) | $C_4H_8O$ | 30 | 7.52 |
| ethyl acetate | $C_4H_8O_2$ | 8.7 | 6(25) |
| methylene chloride | $CH_2Cl_2$ | 1.32 | 9.08 |
| 1,2-dichloroethane | $C_2H_4Cl_2$ | 0.861 | 10.42 |
| t-butyl alcohol | $C_4H_{10}O$ | Miscible | 12.5 |
| 2-butanol | $C_4H_{10}O$ | 15 | 17.26 |
| 1-butanol | $C_4H_{10}O$ | 6.3 | 17.8 |
| 2-butanone | $C_4H_8O$ | 25.6 | 18.6 |
| ethanol | $C_2H_6O$ | Miscible | 24.6 |
| Hexamethylphosphoramide | $C_6H_{18}N_3OP$ | Miscible | 31.3 |
| diethylene glycol | $C_4H_{10}O_3$ | 10 | 31.8 |
| N-methyl-2-pyrrolidinone | $CH_5H_9NO$ | 10 | 32 |
| nitromethane | $CH_3NO_2$ | 9.5 | 35.9 |
| acetonitrile | $C_2H_3N$ | Miscible | 36.64 |
| ethylene glycol | $C_2H_6O_2$ | Miscible | 37.7 |

TABLE 2-continued

Common Organic Solvents Listed According to Dielectric Constant

| Solvent | Formula | Solubility in Water (g/100 g) | Dielectric Constant |
|---|---|---|---|
| dimethyl- | $C_3H_7NO$ | Miscible | 38.25 |
| glycerin | $C_3H_8O_3$ | Miscible | 42.5 |
| dimethyl sulfoxide (DMSO) | $C_2H_6OS$ | 25.3 | 47 |
| water | $H_2O$ | — | 78.54 |
| Petroleum ether (ligroine) | — | — | — |
| Hexamethylphosphorous | $C_6H_{18}N_3P$ | Miscible | ?? |
| water, heavy | $D_2O$ | Miscible | ?? |
| pyridine | $C_5H_5N$ | Miscible | 12.3(25) |
| 2-propanol | $C_3H_8O$ | Miscible | 18.3(25) |
| 1,4-dioxane | $C_4H_8O_2$ | Miscible | 2.21(25) |
| toluene | $C_7H_8$ | 0.05 | 2.38(25) |
| 1-propanol | $C_3H_8O$ | Miscible | 20.1(25) |
| methanol | $CH_4O$ | Miscible | 32.6(25) |

As can be seen by examination of Table 2, a few of the solvents have sufficiently low dielectric points to suggest that they are likely miscible with both other apolar solvents and small amounts of water. In preferred embodiments, a second apolar solvent 202 of the composition 200 may comprise an apolar solvent such as methyl-t-butyl ether, diethyl ether, diethylene glycol, tetrahydrofuran, and ethyl acetate. In further embodiments, a second apolar solvent 202 of the composition 200 may comprise an apolar solvent having a Dielectric Constant of between approximately 2 and 15. It should be understood that a second apolar solvent 202 that is partially miscible with water may comprise two or more apolar solvents that are partially miscible with water. For example, a second apolar solvent of the composition 200 may comprise diethyl ether and ethyl acetate.

Table 3 provides some exemplary solvents that may comprise a second apolar solvent 202 that is at least partially miscible with water. The M indicates complete miscibility. As can be seen from Table 3, a second apolar solvent that is at least partially miscible with water may also include diethylamine, dioxane, and dimethoxyethane which are completely miscible with water.

TABLE 3

| Solvent | Formula | Solubility in Water | Polarity Index |
|---|---|---|---|
| methyl t-butyl ether (MTBE) | $C_5H_{12}O$ | 4.8 | 0.124 |
| diethylamine | $C_4H_{11}N$ | M | 0.145 |
| dioxane | $C_4H_8O_2$ | M | 0.164 |
| N,N-dimethylaniline | $C_8H_{11}N$ | 0.14 | 0.179 |
| chlorobenzene | $C_6H_5Cl$ | 0.05 | 0.188 |
| anisole | $C_7H_8O$ | 0.1 | 0.198 |
| tetrahydrofuran (THF) | $C_4H_8O$ | 30 | 0.207 |
| ethyl acetate | $C_4H_8O_2$ | 8.7 | 0.228 |
| ethyl benzoate | $C_9H_{10}O_2$ | 0.07 | 0.228 |
| water | $H_2O$ | M | 1 |

In preferred embodiments, the second apolar solvent 202 of the composition 200 may comprise any apolar solvent having a polarity index between approximately 0.120 to 0.240.

In preferred embodiments, the composition 200 may comprise a first polar solvent 205 that is miscible with both water and apolar solvents. In further preferred embodiments, a first polar solvent 205 may be miscible with all of the other components of the composition 200 including a 1) apolar paraffin solvent, 2) apolar water-carrying solvent, and 3) a detergent, and is also miscible with a second polar solvent that is preferably water. The purpose of the first polar solvent 205 is to act as a carrier for all of the other components. Typical polar solvents include alcohols, such as methanol, ethanol, and propanol. However, such solvents are both volatile, giving off noxious fumes, and flammable. There are other polar solvents that have low volatility and are non-flammable, such as certain glycols and carbitols. In preferred embodiments, a first polar solvent 205 of the composition 200 may comprise a polar solvent such as ethylene glycol, propylene glycol, tripropylene glycol, polyethylene glycol, and butyl carbitol. In further embodiments, the first polar solvent 205 may be any polar solvent that is miscible with all of the other elements of this invention including 1) paraffin solvent 201, 2) apolar water-carrying solvent 202, 3) detergent 203, and 4) water 204, such as other glycols and carbitols. It should be understood that a first polar solvent that is partially miscible with water may comprise two or more polar solvents that are miscible with both water and apolar solvents. For example, a first polar solvent of the composition 200 may comprise tripropylene glycol and butyl carbitol.

Table 4 provides some exemplary solvents that may comprise a first polar solvent 205 that is that is miscible with both water and apolar solvents. The M indicates complete miscibility.

TABLE 4

| Solvent | Formula | Solubility in Water | Polarity Index |
|---|---|---|---|
| methylene chloride | $CH_2Cl_2$ | 1.32 | 0.309 |
| 2-pentanone | $C_5H_{10}O$ | 4.3 | 0.321 |
| 2-butanone | $C_4H_8O$ | 25.6 | 0.327 |
| 1,2-dichloroethane | $C_2H_4Cl_2$ | 0.87 | 0.327 |
| benzonitrile | $C_7H_5N$ | 0.2 | 0.333 |
| acetone | $C_3H_6O$ | M | 0.355 |
| dimethylformamide (DMF) | $C_3H_7NO$ | M | 0.386 |
| t-butyl alcohol | $C_4H_{10}O$ | M | 0.389 |
| aniline | $C_6H_7N$ | 3.4 | 0.42 |
| dimethylsulfoxide (DMSO) | $C_2H_6OS$ | M | 0.444 |
| acetonitrile | $C_2H_3N$ | M | 0.46 |
| 3-pentanol | $C_5H_{12}O$ | 5.1 | 0.463 |
| 2-pentanol | $C_5H_{12}O$ | 4.5 | 0.488 |
| 2-butanol | $C_4H_{10}O$ | 18.1 | 0.506 |
| cyclohexanol | $C_6H_{12}O$ | 4.2 | 0.509 |
| 1-octanol | $C_8H_{18}O$ | 0.096 | 0.537 |
| 2-propanol | $C_3H_8O$ | M | 0.546 |
| 1-heptanol | $C_7H_{16}O$ | 0.17 | 0.549 |
| i-butanol | $C_4H_{10}O$ | 8.5 | 0.552 |
| 1-hexanol | $C_6H_{14}O$ | 0.59 | 0.559 |
| 1-pentanol | $C_5H_{12}O$ | 2.2 | 0.568 |
| acetyl acetone | $C_5H_8O_2$ | 16 | 0.571 |
| ethyl acetoacetate | $C_6H_{10}O_3$ | 2.9 | 0.577 |
| 1-butanol | $C_4H_{10}O$ | 7.7 | 0.586 |
| benzyl alcohol | $C_7H_8O$ | 3.5 | 0.608 |
| 1-propanol | $C_3H_8O$ | M | 0.617 |
| acetic acid | $C_2H_4O_2$ | M | 0.648 |
| 2-aminoethanol | $C_2H_7NO$ | M | 0.651 |
| ethanol | $C_2H_6O$ | M | 0.654 |
| diethylene glycol | $C_4H_{10}O_3$ | M | 0.713 |
| methanol | $CH_4O$ | M | 0.762 |
| ethylene glycol | $C_2H_6O_2$ | M | 0.79 |
| glycerin | $C_3H_8O_3$ | M | 0.812 |
| water, heavy | $D_2O$ | M | 0.991 |
| water | $H_2O$ | M | 1 |

In preferred embodiments, a first polar solvent 205 of the composition 200 may comprise a polar solvent that is miscible with both water and apolar solvents having a polarity index between approximately 0.300 to 1.00.

In preferred embodiments, the composition 200 may comprise a detergent 203. Detergents can be used to prepare emulsions containing both apolar solvents and water. The detergent contains both hydrophilic and hydrophobic regions that can surround a group of water molecules in a structure called a micelle, thus shielding the water from direct contact with the apolar solvent. The detergent orients itself with the hydrophilic portion pointing toward the interior of the shell where the water resides, and the hydrophobic portion pointing to the outside of the shell where the apolar solvent resides. This orientation allows the micelles to remain suspended in a relatively stable mixture. However, after a long period of time the micelles eventually merge and become large enough that they fall out of suspension resulting in phase separation. In preferred embodiments, a detergent 203 may comprise a non-ionic detergent having a net neutral charge, such as APO-10, APO-12, Big CHAP, Big CHAP, Deoxy, BRIJ® 35, 1L, C12E5, C12E6, C12E8, C12E9, Cyclohexyl-n-methyl- -D-maltoside, n-Decanoylsucrose, n-Decyl- -D-maltopyranoside, n-Decyl- -D-thiomaltoside, Digitonin, n-Dodecanoylsucrose, n-Dodecyl- -D-glucopyranoside, n-Dodecyl- -D-maltoside, ELUGENT™ (non-ionic detergent composed of a mixture of alkyl glucosides), GENAPOL® C-100, GENAPOL® X-80, GENAPOL® X-100, n-Heptyl- -D-glucopyranoside, n-Heptyl- -D-thioglucopyranoside, n-Hexyl- -D-glucopyranoside, MEGA-8, MEGA-9, MEGA-10, n-Nonyl- -D-glucopyranoside, NP-40, n-Octanoyl- -D-glucosylamine (NOGA), n-Octanoyl sucrose, n-Octyl- -D-glycopyranoside, n-Octyl- -D-maltopyranoside, n-Octyl- -D-thioglycopyranoside, PLURONIC® F-127, TRITON® X-100, TRITON® X-114, TWEEN® 20, TWEEN® 80, n-Undecyl- -D-maltoside, and Tergitol.

In some preferred embodiments, a detergent 203 of the composition 200 may comprise a nonylphenol non-ionic detergent, such as nonylphenols and nonylphenol ethoxylates including NP-9, NP-40, and the like. In further preferred embodiments, a detergent 203 of the composition 200 may comprise a polyoxyethylene based non-ionic detergent, such as in the Tween, Triton, and the BRIJ® series, including: Tween 20, 40, 60, 65, 80, 300; BRIIJ® 20, 58, S100, L23, 93, C10, O10, S10, S20, 35; and Triton X-100, 1-45, X-114, X-305, X-405, X-102. These materials are also known as ethoxylates or PEGlyates and their metabolites, nonylphenol.

In further preferred embodiments, a detergent 203 of the composition 200 may comprise a glycoside non-ionic detergent having a sugar as their uncharged hydrophilic headgroup. Examples of glycoside non-ionic detergents include octyl thioglucoside and maltosides. In further preferred embodiments, a detergent 203 of the composition 200 may comprise a HEGA and/or a MEGA series detergent(s) which are similar, possessing a sugar alcohol as headgroup. It should be understood that a detergent 203 of the composition 200 may comprise two or more detergents. For example, a detergent of the composition 200 may comprise Digitonin and n-Dodecanoyl sucrose.

The following examples better illustrate the compositions of the deparaffinization reagents that were investigated. Those compositions turning cloudy were eliminated from further evaluation, whereas those compositions that were clear were tested for their deparaffinization capabilities.

Example 1. Compositions of Deparaffinization Reagents

The following Tables 2-8 list the various compositions tested. NP9 is a nonionic detergent also known by the trade name Tergitol NP9. DL is a paraffin solvent 201 known by the chemical name D-limonene

TABLE 5

Compositions Comprising 0% NP9 Detergent

| DL | H2O | Results |
|---|---|---|
| 25.00% | 0.00% | Clear |
| 22.50% | 2.50% | Clear |
| 20.00% | 5.00% | Cloudy |
| 17.50% | 7.50% | Cloudy |
| 15.00% | 10.00% | Cloudy |
| 12.50% | 12.50% | Cloudy |
| 10.00% | 15.00% | Cloudy |
| 7.50% | 17.50% | Cloudy |
| 5.00% | 20.00% | Cloudy |
| 2.50% | 22.50% | Clear |
| 0.00% | 25.00% | Clear |

Ratio 9:1

TABLE 6

Compositions Comprising 2% NP9 Detergent

| DL | H2O | Results |
|---|---|---|
| 25.00% | 0.00% | Clear |
| 22.50% | 2.50% | Clear |
| 20.00% | 5.00% | Clear |
| 17.50% | 7.50% | Cloudy |
| 15.00% | 10.00% | Cloudy |
| 12.50% | 12.50% | Cloudy |
| 10.00% | 15.00% | Cloudy |
| 7.50% | 17.50% | Cloudy |
| 5.00% | 20.00% | Clear |
| 2.50% | 22.50% | Clear |
| 0.00% | 25.00% | Clear |

Ratio 4:1

TABLE 7

Compositions Comprising 3% NP9 Detergent

| DL | H2O | Results |
|---|---|---|
| 25.00% | 0.00% | Clear |
| 22.50% | 2.50% | Clear |
| 20.00% | 5.00% | Clear |
| 17.50% | 7.50% | Clear |
| 15.00% | 10.00% | Cloudy |
| 12.50% | 12.50% | Cloudy |
| 10.00% | 15.00% | Cloudy |
| 7.50% | 17.50% | Clear |
| 5.00% | 20.00% | Clear |
| 2.50% | 22.50% | Clear |
| 0.00% | 25.00% | Clear |

Ratio = 2.3:1

TABLE 8

Compositions Comprising 1% Ethyl Acetate Apolar Solvent

| DL | H2O | Results |
|---|---|---|
| 25.00% | 0.00% | Clear |
| 22.50% | 2.50% | Clear |
| 20.00% | 5.00% | Clear |
| 17.50% | 7.50% | Cloudy |
| 15.00% | 10.00% | Cloudy |
| 12.50% | 12.50% | Cloudy |
| 10.00% | 15.00% | Cloudy |
| 7.50% | 17.50% | Cloudy |
| 5.00% | 20.00% | Clear |
| 2.50% | 22.50% | Clear |
| 0.00% | 25.00% | Clear |

Ratio 4:1

TABLE 9

Compositions Comprising 2% Ethyl Acetate Apolar Solvent

| DL | H2O | Results |
|---|---|---|
| 25.00% | 0.00% | Clear |
| 22.50% | 2.50% | Clear |
| 20.00% | 5.00% | Clear |
| 17.50% | 7.50% | Clear |
| 15.00% | 10.00% | Cloudy |
| 12.50% | 12.50% | Cloudy |
| 10.00% | 15.00% | Cloudy |
| 7.50% | 17.50% | Clear |
| 5.00% | 20.00% | Clear |
| 2.50% | 22.50% | Clear |
| 0.00% | 25.00% | Clear |

Ratio 2.3:1

TABLE 10

Compositions Comprising 3% NP9 Detergent and 2% Ethyl Acetate Apolar Solvent

| DL | H2O | Results |
|---|---|---|
| 25.00% | 0.00% | Clear |
| 22.50% | 2.50% | Clear |
| 20.00% | 5.00% | Clear |
| 17.50% | 7.50% | Clear |
| 15.00% | 10.00% | Clear |
| 12.50% | 12.50% | Clear |
| 10.00% | 15.00% | Clear |
| 7.50% | 17.50% | Clear |
| 5.00% | 20.00% | Clear |
| 2.50% | 22.50% | Clear |
| 0.00% | 25.00% | Clear |

Ratio 1:1

Example 2. Compositions of Deparaffinization Reagents and Water at a Ratio of 1:1

As can be seen by these results, the compositions of Table 10 allowed a mixture of D-limonene and water at a ratio of 1:1. This ratio was selected as the most likely ratio of paraffin solvent to water to give both efficient deparaffinization and also allow direct transfer from deparaffinization reagent to pure aqueous reagent. The compositions of Table 10 included 3% NP9 plus 2% Ethyl acetate.

Using the information from Table 10, the maximum amount of d-limonene plus water at a ratio of 1:1 was determined. These results are listed in Table 11.

TABLE 11

Compositions Comprising 3% NP9 Detergent and 2% Ethyl Acetate Apolar Solvent Maximum Water To Produce Clear Mixtures

| DL | H2O | Results |
|---|---|---|
| 5% | 5% | Clear |
| 10% | 10% | Clear |

TABLE 11-continued

Compositions Comprising 3% NP9 Detergent and 2% Ethyl Acetate
Apolar Solvent Maximum Water To Produce Clear Mixtures

| DL | H2O | Results |
|---|---|---|
| 15% | 15% | Clear |
| 20% | 20% | Clear |
| 25% | 25% | Clear |
| 30% | 30% | Cloudy |

Ratio 1:1
Total =< 50%

The results shown in Table 8 indicate that up to 25% D-limonene and 25% water could be mixed together to form clear mixtures.

Example 3. Deparaffinization of Microscope Slides

Representative compositions of d-limonene plus water were tested for their ability to deparaffinize microscope slides containing histological tissue sections. Tonsil tissues were embedded in paraffin wax, were sectioned as thin sections of approximately 4 micrometer, and adhered to microscope slides. The microscope slides with the paraffin-embedded tissues were deparaffinized in preparation for immunohistochemical staining. Efficiency of deparaffinization was assessed as follows:

1. Removal of Paraffin from the Glass Portion of the Microscope Slide.

After deparaffinization was complete the slides were visually examined and the amount of remaining paraffin was estimated as a percentage between 0% and 100%

2. Removal of Paraffin from Beneath the Tissue.

After deparaffinization was complete the slides were microscopically examined and the amount of paraffin remaining between the glass slide and the tissue was estimated on a scale of 0-4, with 0 being no paraffin removal and 4 being complete paraffin removal. Grades of 1, 2, and 3 represented approximately 25%, 50%, and 75% paraffin removal respectively 3. Transfer of Deparaffinized Slides to a Water Solution.

Following deparaffinization, slides were removed, drained to allow excess deparaffinization reagent to drip off, and then transferred to water. If the slides turned cloudy this indicated incomplete mixing with the water, whereas if the slides remained clear this indicated complete mixing of any remaining deparaffinization reagent with the water.

4. Reagent Spread

After the slides were rinsed in water, they were equilibrated with an aqueous buffer solution for 5 minutes. After equilibration the slides were drained and placed tissue-side up on a horizontal platform. 100 microliters of an aqueous staining reagent was applied over the tissue. If residual paraffin or deparaffinization reagent remained on the slide, this created hydrophobic areas that repelled the aqueous reagent. If the paraffin and deparaffinization reagents were completely removed all areas of the slide were hydrophilic and there was no repulsion of the aqueous reagent. In this case the aqueous reagent spread evenly across the entire slide without streaking or pooling. Even spread of reagent was graded on a scale of 0-4 with 0 being significant repulsion of aqueous reagent and 4 being no repulsion of aqueous reagent. Grades of 1, 2, and 3 were intermediate with major, moderate, and minimal repulsion respectively.

TABLE 12

Deparaffinization of Microscope Slides

| Compositions (containing 3% NP9 + 2% Ethyl acetate) | Parameters measured | | | |
|---|---|---|---|---|
| | Deparaffinization on glass slide | Deparaffinization beneath tissue | Transfer to buffer | Reagent spread |
| 25% DL | 100% | 100% | Cloudy | 1+ |
| 25% water | 25% | 0% | Clear | 3+ |
| 5% DL + 5% Water | 75% | 50% | Clear | 4+ |
| 10% DL + 10% Water | 100% | 100% | Clear | 4+ |
| 20% DL + 20% Water | 100% | 100% | Clear | 4+ |
| 25% DL + 25% Water | 100% | 100% | Clear | 4+ |

As can be seen from the results of Table 9, only compositions that contained between 10%-25% D-limonene and 10%-25% water were effective deparaffinization reagents.

In a second embodiment, the invention is directed to a method for removing paraffin wax from biological samples. Biological samples to be evaluated by microscopy are commonly embedded in paraffin. The methods of paraffin-embedding are standard histological methods and are well known in the art. The purpose of embedding the sample in paraffin is to provide a firm matrix for the tissue such that it can be cut into small slices of approximately 4 micrometer thickness. The cut sections are then place onto a microscope slide where they will adhere due to molecular interactions between the sample and the microscope slide.

The samples still containing paraffin are then deparaffinized to eliminate the paraffin from the sample. The present invention describes a deparaffinizing method for removing paraffin wax from a biological sample ("the method") 100 as shown in FIG. 1. The method 100 may be performed using a deparaffinizing composition 200 comprising a first apolar paraffin solvent 201, a second apolar solvent 202 that is partially miscible with water, a first polar solvent 205 that is miscible with both water and apolar solvents, a second polar solvent 204 that is water, and a detergent 203 as previously described.

In some embodiments, the method 100 may start 101 and the sample may be incubated for a time period in a deparaffinizing composition 200 in step 102. In further preferred embodiments, the sample may be incubated in the deparaffinizing composition 200 by heating the sample and the composition 200 to between approximately 35 to 65 degrees, and more preferably between approximately 45 to 60 degrees, Celsius. In still further embodiments, the sample and the composition 200 may be heated to a temperature that is greater than 20 degrees Celsius and less than the melting point of the paraffin that the sample is embedded in. The solubilized paraffin is released into the composition 200, and simultaneously the tissue becomes infiltrated with the composition 200. The composition 200 of the present invention also contains water such that the sample becomes partially rehydrated as the paraffin is removed. Typically, a paraffin solvent and water are immiscible. However, the composition 200 of the present invention overcomes this limitation.

The sample may be incubated in the deparaffinizing composition 200 for any desired time period. In preferred embodiments, the sample may be incubated in the deparaffinizing composition 200 a time period of between approximately 2 to 45 minutes and more preferably between approximately 5 to 30 minutes.

In step 103, the sample may be rinsed with an aqueous solution preferably comprising an aqueous buffer. Any suitable aqueous solution may be used to rinse the composition 200 and solubilized paraffin from the sample including water. In preferred embodiments, the sample may be rinsed with an aqueous buffer such as 0.1M Phosphate buffer having approximately a pH 7.6 or 0.05M Tris buffer having approximately a pH 7.2. After step 103, the method 100 may finish 104.

The method 100 and composition 200 are novel and superior to existing methods and compositions for removing paraffin wax from biological samples in many ways including not being complex, time consuming, or utilizing expensive and/or toxic materials. This is especially apparent when comparing the method 100 and composition 200 of the present invention to the Standard Method for Deparaffinization and Rehydration of Paraffin-embedded Tissue Sections as shown in Table 13.

TABLE 13

| Step | Reagent | Time |
|---|---|---|
| | Deparaffinization | |
| 1 | 100% Xylene | 5-30 min |
| 2 | 100% Xylene | 5-30 min |
| | Clearing | |
| 3 | 50% Xylene/50% Ethanol | 5-30 min |
| 4 | 50% Xylene/50% Ethanol | 5-30 min |
| 5 | 100% Ethanol | 5-30 min |
| 6 | 100% Ethanol | 5-30 min |
| | Rehydration | |
| 7 | 90% Ethanol/10% Water | 5-30 min |
| 8 | 50% Ethanol/50% Water | 5-30 min |
| 9 | 100% Water | 5-30 min |
| 10 | 100% Buffer | |

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A deparaffinizing composition for removing paraffin wax from biological samples for the staining and imaging of the biological samples, the composition comprising:
a paraffin solvent comprising: a first apolar solvent and a second apolar solvent, the second apolar solvent having a polarity index between 0.120 to 0.240, being partially miscible with water and the second apolar solvent comprising at least 1% of the total volume of the deparaffinizing composition and less than 50% of the paraffin solvent;
a first polar solvent that is miscible with water and the first and the second apolar solvents;
greater than 15% by volume water suitable for rehydrating the biological sample and less than 25% by volume water;
a detergent; and
wherein a ratio of the paraffin solvent to the water is about 1 to 1 by volume while keeping the detergent to less than 6% of the total volume of the deparaffinizing composition.

2. The composition of claim 1, wherein the composition comprises:
between 1% to 40%, by volume, the first polar solvent.

3. The composition of claim 1, wherein the composition comprises:
between 20% to 30%, by volume, the first polar solvent.

4. The composition of claim 1, wherein the composition comprises approximately:
25%, by volume, the paraffin solvent;
2%, by volume, the second apolar solvent;
3%, by volume, the detergent;
less than 25%, by volume, the water; and
25%, by volume, the first polar solvent.

5. The composition of claim 1, wherein the first apolar paraffin solvent is selected from the group consisting of; xylene, toluene, d-limonene, and naphthalene.

6. The composition of claim 1, wherein the first apolar paraffin solvent has a polarity index less than 0.120.

7. The composition of claim 1, wherein the second apolar solvent is selected from the group consisting of; methyl-t-butyl ether, diethyl ether, tetrahydrofuran, and ethyl acetate.

8. The composition of claim 1, wherein the first polar solvent is selected from the group consisting of; ethylene glycol, propylene glycol, tripropylene glycol, polyethylene glycol, t-butyl alcohol, ethanol, 2-propanol, 1-propanol, methanol and butyl carbitol.

9. The composition of claim 1, wherein the first polar solvent has a polarity index between approximately 0.300 to 1.00.

10. The composition of claim 1, wherein the detergent is a non-ionic detergent.

11. The composition of claim 1, wherein the detergent is a non-ionic detergent selected from the group consisting of; nonylphenol non-ionic detergents, polyoxyethylene based non-ionic detergents, and glycoside non-ionic detergents.

12. A deparaffinizing method for removing paraffin wax from a biological sample, the method comprising the steps of:
incubating the sample for a time period in a deparaffinizing composition of claim 1, the composition comprising a paraffin solvent that comprises a first apolar paraffin solvent, a second apolar solvent that is partially miscible with water, a first polar solvent that is miscible with both water and apolar solvents, a second polar solvent that is water, and a detergent; and
rinsing the sample with an aqueous buffer.

13. The method of claim 12, wherein the step of incubating the sample for a time period in a deparaffinizing composition comprises heating the sample and the composition to between approximately 35 to 65 degrees Celsius.

14. The method of claim 12, wherein the step of incubating the sample for a time period in a deparaffinizing composition comprises heating the sample and the composition to between approximately 45 to 60 degrees Celsius.

15. The method of claim 12, wherein the time period is between approximately 2 to 45 minutes.

16. The method of claim 12, wherein the composition comprises approximately 25%, by volume, paraffin solvent; 2%, by volume, second apolar solvent; 3%, by volume, detergent; between 20% to less than 25%, by volume water; and 25%, by volume, first polar solvent.

17. The method of claim 12, wherein the paraffin solvent comprises a first apolar paraffin solvent selected from the group consisting of xylene, toluene, d-limonene, and naphthalene.

* * * * *